(12) United States Patent
Yang et al.

(10) Patent No.: US 11,720,118 B2
(45) Date of Patent: Aug. 8, 2023

(54) METHOD FOR UNMANNED VEHICLE CRUISING, UNMANNED VEHICLE AND STORAGE MEDIUM

(71) Applicant: Apollo Intelligent Driving Technology (Beijing) Co., Ltd., Beijing (CN)

(72) Inventors: Fan Yang, Beijing (CN); Shiyu Song, Sunnyvale, CA (US); Shuang Zhang, Beijing (CN)

(73) Assignee: Apollo Intelligent Driving Technology (Beijing) Co., Ltd., Beijing (CN)

( * ) Notice: Subject to any disclaimer, the term of this patent is extended or adjusted under 35 U.S.C. 154(b) by 259 days.

(21) Appl. No.: 16/914,699

(22) Filed: Jun. 29, 2020

(65) Prior Publication Data
US 2021/0004020 A1    Jan. 7, 2021

(30) Foreign Application Priority Data

Jul. 1, 2019  (CN) .......................... 201910586476.0

(51) Int. Cl.
*G05D 1/02* (2020.01)
*G05D 1/00* (2006.01)
*G01C 21/00* (2006.01)

(52) U.S. Cl.
CPC ....... *G05D 1/0274* (2013.01); *G01C 21/3833* (2020.08); *G01C 21/3848* (2020.08);
(Continued)

(58) Field of Classification Search
CPC .. G05D 1/0274; G05D 1/0011; G05D 1/0223; G05D 1/0276; G05D 2201/0213;
(Continued)

(56) References Cited

U.S. PATENT DOCUMENTS 9,030,530 B2 * 5/2015 Izzat .................... H04N 13/144
                                                        348/47
2014/0309833 A1   10/2014 Ferguson et al.
(Continued)

FOREIGN PATENT DOCUMENTS

CN        105735676 A  *  7/2016    ........... E04H 1/1211
CN        103823382 B  *  8/2016
(Continued)

OTHER PUBLICATIONS

English Translation of CN 103823382 B.*
(Continued)

*Primary Examiner* — Rami Khatib
*Assistant Examiner* — Shahira Baajour
(74) *Attorney, Agent, or Firm* — Harness, Dickey & Pierce, P.L.C.

(57) ABSTRACT

The embodiments provide a method for unmanned vehicle cruising, an unmanned vehicle and a storage medium, the method includes: in a state that a slow cruising function is started, cruising according to a preset cruising mode, and collecting running data through a sensing device, where the running data is data of an environment in which a vehicle locates, collected by the vehicle during a running process; and generating a map based on the collected running data. The embodiments of the present disclosure solve the problem that an unmanned vehicle in the prior art cannot update a map in time and, in particular, cannot develop a more suitable map according to different surrounding environments.

12 Claims, 2 Drawing Sheets

---

Starting a slow cruising function, and collecting running data through a sensing device — S101

Generating map data based on running data — S102

(52) U.S. Cl.
CPC ......... *G05D 1/0011* (2013.01); *G05D 1/0223* (2013.01); *G05D 1/0276* (2013.01); *G05D 2201/0213* (2013.01)

(58) Field of Classification Search
CPC ......... G05D 2201/0207; G05D 1/0214; G05D 1/0242; G05D 1/0246; G05D 1/0255; G05D 2201/02; G01C 21/32
See application file for complete search history.

(56) References Cited

U.S. PATENT DOCUMENTS

| | | | |
|---|---|---|---|
| 2017/0015319 A1* | 1/2017 | Knoller | B60W 50/0097 |
| 2020/0353952 A1 | 11/2020 | Suzuki et al. | |
| 2021/0325207 A1 | 10/2021 | Lin et al. | |

FOREIGN PATENT DOCUMENTS

| | | |
|---|---|---|
| CN | 107544515 A | 1/2018 |
| CN | 108205325 A | 6/2018 |
| CN | 109176537 A | 1/2019 |
| CN | 109358627 A | 2/2019 |
| CN | 109374069 A | 2/2019 |
| CN | 109405844 A | 3/2019 |
| CN | 109612525 A | 4/2019 |
| CN | 109783593 A | 5/2019 |
| CN | 109828561 A | 5/2019 |
| JP | S61-165107 A | 7/1986 |
| JP | 2020527805 A | 9/2020 |
| WO | 2019018695 A1 | 1/2019 |
| WO | 2019093193 A1 | 5/2019 |

OTHER PUBLICATIONS

English Translation of CN109358627A.*
English Translation of CN-105735676-A.*
Pearce, Carolyn, et al.: "Designing a Spatially Aware, Automated Quadcopter Using an Android Control System," 2014 Systems and Information Engineering Design Symposium (SIEDS), IEEE, Apr. 25, 2014, pp. 23-28.
Extended European Search Report for European Patent Application No. 20165523.0-1202, dated Sep. 10, 2020.
Office Action for priority Chinese patent application No. 201910586476.0 dated Oct. 11, 2021, nine pages.
First Office Action of corresponding Japanese patent application No. 2020-096258, dated Apr. 13, 2021, five pages.
Office Action for corresponding Japanese patent application No. 2020-096258, dated Nov. 19, 2021, in Japanese with English translation, eight pages.
Office Action for corresponding Chinese patent application No. 201910586476.0 dated Mar. 30, 2022, with Concise Explanation of Relevance (in English), 11 pages.
Office Action for priority Chinese patent application No. 201910586476.0 dated Oct. 11, 2021, with English translation, 17 pages.

* cited by examiner

METHOD FOR UNMANNED VEHICLE CRUISING, UNMANNED VEHICLE AND STORAGE MEDIUM

CROSS-REFERENCE TO RELATED APPLICATION

This application claims priority to Chinese Patent Application No. 201910586476.0, filed on Jul. 1, 2019, which is hereby incorporated by reference in its entirety.

TECHNICAL FIELD

Embodiments of the present disclosure relate to the field of unmanned driving and, in particular, to a method for unmanned vehicle cruising, an unmanned vehicle and a storage medium.

BACKGROUND

With the continuous development of the field of unmanned driving, unmanned vehicles will play more and more roles and have more and more functions. For example, unmanned vehicles are used in trucks, cleaning robots, taxis and coaches, etc.

In the prior art, unmanned vehicles have two operating modes, one is a map-less mode and the other is a map-highly dependent mode. The unmanned vehicle in the map-less mode drives according to surrounding environment collected in real time. The unmanned vehicle in the map-highly dependent mode can drive according to a map and a route stored in a vehicle terminal or obtained from a cloud server.

However, driving paths of the unmanned vehicles in the map-less mode is difficult to fully control, while the unmanned vehicles in the map-highly dependent mode are not sensitive to changes of information about roads, people flow and etc. and thus cannot adapt to the surrounding complex environment. In addition, the current unmanned vehicles only run during working hours and stop during non-working hours, causing waste of resources of unmanned vehicles. In summary, there's a problem that the current unmanned vehicle cannot update the map in a timely manner and, in particular, cannot develop a more suitable map according to the surrounding environment.

SUMMARY

Embodiments of the present disclosure provide a method and a device for unmanned vehicle cruising and a storage medium, which are used to solve the problem existed in the prior art that the unmanned vehicle in a map-less mode does not run stably, and the unmanned vehicle in a map-highly dependent mode is not sensitive to changes of information about roads, people flow and etc.

In a first aspect, an embodiment of the present disclosure provides a method for unmanned vehicle cruising, which is applied to an unmanned vehicle, including:

in a state that a slow cruising function is started, cruising according to a preset cruising mode, and collecting running data through a sensing device, where the running data is data of an environment in which a vehicle locates, collected by the vehicle during a running process; and generating a map based on the running data.

In a specific implementation manner, the method further includes:

determining an operating mode of the unmanned vehicle according to the running data, where the operating mode includes a working mode and corresponding location information.

In a specific implementation manner, the method further includes:

starting a slow cruising function according to a slow cruising start command sent by a remote control device;

or, starting the slow cruising function if a duration that the unmanned vehicle is in a idle state exceeds a preset duration;

or, starting the slow cruising function according to a preset time.

Further, the cruising mode includes at least: an S-type cruising mode and a circle-type cruising mode.

Further, the sensing device includes at least one of following: an infrared sensor, a binocular camera, a monocular camera, an ultrasonic sensor, a temperature sensor, a humidity sensor, and a gas sensor.

Further, the running data includes at least one of following: images, distances of obstacles, temperature, humidity and air quality, which are collected during a running process.

Further, before the generating a map based on the running data and the determining an operating mode of the unmanned vehicle according to the running data, the method further includes:

determining whether the running data can be used to generate a map or determine an operating mode according to a preset quality standard.

In a second aspect, an embodiment of the present disclosure provides an unmanned vehicle, including:

a processing module, configured to cruise according to a preset cruising mode, in a state that a slow cruising function is started; and a collecting module, configured to collect running data through a sensing device, where the running data is data of an environment in which a vehicle locates, collected by the vehicle during a running process;

the processing module is further configured to generate a map based on the running data.

Further, the processing module is further configured to determine an operating mode of the unmanned vehicle according to the running data, where the operating mode includes a working mode and corresponding location information.

Further, the processing module is further configured to start a slow cruising function according to a slow cruising start command sent by a remote control device;

or, start the slow cruising function if a duration that the unmanned vehicle is in a idle state exceeds a preset duration;

or, start the slow cruising function according to a preset time.

Further, the cruising mode includes at least: an S-type cruising mode and a circle-type cruising mode.

Further, the sensing device includes at least one of following: an infrared sensor, a binocular camera, a monocular camera, an ultrasonic sensor, a temperature sensor, a humidity sensor, and a gas sensor.

Further, the processing module is further configured to determine whether the running data can be used to generate a map or determine an operating mode according to a preset quality standard.

In a third aspect, an embodiment of the present disclosure provides an unmanned vehicle, including: at least one processor, a memory, and a computer program; where the memory is configured to store computer-executable instructions;

the at least one processor is configured to execute the computer-executable instructions stored in the memory, so as to implement the method for unmanned vehicle cruising according to the first aspect.

In a fourth aspect, a computer-readable storage medium, where the computer-readable storage medium is configured to store computer-executable instructions, which are used to implement the method for unmanned vehicle cruising according to the first aspect when being executed by a processor.

The method and the device for unmanned vehicle cruising and the storage medium provided by the embodiment, collect maps and modify existing map information through a slow cruising. The problems in the prior art that the unmanned vehicle in the map-less mode does not run stably enough and the unmanned vehicle in the map-highly dependent mode is not sensitive to changes of information about roads, people flow and etc. The utilization and the running reliability of the unmanned vehicle are improved.

BRIEF DESCRIPTION OF THE DRAWINGS

In order to more clearly explain the embodiments of the present disclosure or the technical solutions in the prior art, the drawings that are used in the embodiments or the prior art description will be briefly introduced below. Obviously, the drawings in following description are some embodiments of the present disclosure. For those of ordinary skill in the art, other drawings can be obtained based on these drawings without paying creative labor.

DESCRIPTION OF EMBODIMENTS

In order to make the objectives, technical solutions, and advantages of the embodiments of the present disclosure clearer, the technical solutions in the embodiments of the present disclosure will be clearly and completely described below with reference to the drawings in the embodiments of the present disclosure. Obviously, the described embodiments are a part of the embodiments of the present disclosure, but not all the embodiments. Based on the embodiments of the present disclosure, all other embodiments obtained by a person of ordinary skill in the art without creative efforts, all belong to the scope of protection of the present disclosure.

In the prior art, an unmanned vehicle has two operating modes, one is a map-less mode and the other is a map-highly dependent mode. The operating of the map-less mode is not stable enough and a running along a specified route cannot be implemented under the map-less mode. The map-highly dependent mode is not sensitive to changes of information about roads, people flow and etc., and thus cannot adapt to a surrounding complex environment. In addition, the unmanned vehicle runs only during working hours and stops during non-working hours, causing waste of resources of the unmanned vehicle.

In view of the above problems, the present disclosure proposes a method and a device for unmanned vehicle cruising and a storage medium. The map-less mode and the map-highly dependent mode are combined, and the unmanned vehicle can collect maps and modify existing maps through a slow cruising. The problems in the prior art that the unmanned vehicle in the map-less mode does not run stable enough, and the unmanned vehicle in the map-highly dependent mode is not sensitive to changes of information about roads, people flow and etc. The utilization and the running reliability of the unmanned vehicle are improved. The following describes the solutions in detail through several specific embodiments.

Figure 1:
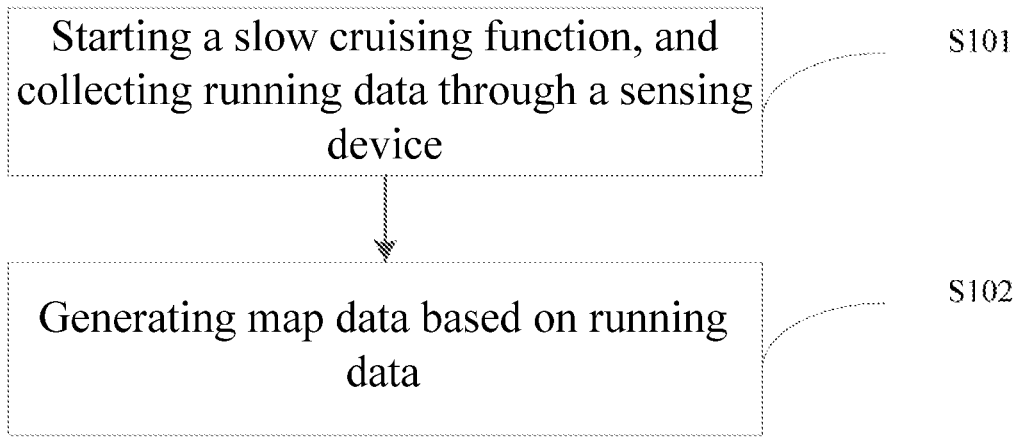
FIG. 1 is a schematic flowchart of a first embodiment of a method for unmanned vehicle cruising provided by an embodiment of the present disclosure.

FIG. 1 is a schematic flowchart of a first embodiment of a method for unmanned vehicle cruising provided by an embodiment of the present disclosure. As shown in FIG. 1, the specific implementation steps of the method for unmanned vehicle cruising include:

S101: starting a slow cruising function, and collecting running data through a sensing device.

In the step, in the state that the slow cruising function is started, a cruising is performed according to a preset cruising mode, and the running data is collected through a sensing device. The running data is data of an environment in which a vehicle locates, collected by the vehicle during running.

The unmanned vehicle can perform slow cruising in a S-type cruising mode, a circle-type cruising mode, or a cruising mode of any other cruising route. For different working environments and working hours, different cruising modes can be preset. The solution does not make specific requirements for this.

The unmanned vehicle is equipped with a variety of sensing devices, such as an infrared sensor, a binocular camera, a monocular camera, an ultrasonic sensor, a temperature sensor, a humidity sensor, and a gas sensor, etc. Through these sensing devices, the unmanned vehicle can collect images of the surrounding environment, distance of obstacles, temperature, humidity, air quality and etc. during a running process.

S102: generating map data based on running data.

In the step, store the running data collected in step S101 and generate map data, where the map data includes: obstacles, traffic signs, traffic lights, personnel density, road cleanliness, communication quality and etc.

Before generating the map data, check the collected running data according to a preset quality standard, for example, determine whether image sharpness meets a requirement of the quality standard. Data that meets the preset quality standard is used to generate map data, and data that does not meet is discarded. The newly generated map data is used to update map information and then the updated map information is uploaded to the cloud for downloading by other unmanned vehicles.

In a specific implementation, during the cruising process, the unmanned vehicle collects new road information, generates map data after checking the new road information according to the preset quality standard, and updates map information in the cloud. After the other unmanned vehicles obtain updated map information through the cloud, the other unmanned vehicles can obtain new road information and use the new map information to plan driving routes. During the cruising process, the unmanned vehicle collects road congestion information, generates map data, and uploads the map data to the cloud. The other unmanned vehicles obtain road congestion information through the cloud and then re-plan work paths to avoid congested road sections.

The method for unmanned vehicle cruising provided in the embodiment, collects running data through a sensing device, and generates a map based on running data. Timely correction of the map is realized without affecting normal work of the unmanned vehicle, so that unmanned vehicle in a working mode can always complete the work according to the latest map.

Figure 2:
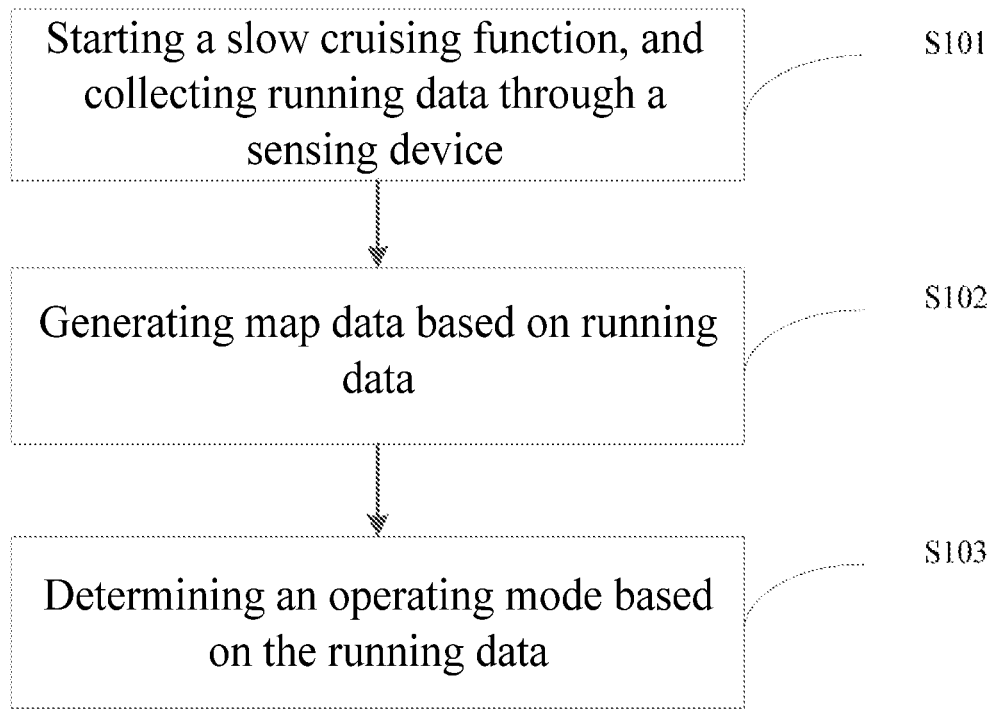
FIG. 2 is a schematic flowchart of a second embodiment of a method for unmanned vehicle cruising provided by an embodiment of the present disclosure.

On the basis of the above embodiments, FIG. 2 is a schematic flowchart of a second embodiment of a method for unmanned vehicle cruising provided by an embodiment of the present disclosure. As shown in FIG. 2, the method for unmanned vehicle cruising further includes following steps:

S103: determining an operating mode based on the running data.

In the step, determine the operating mode of the unmanned vehicle according to the running data collected in step S101, where the operating mode includes a working mode and corresponding location information, that is to determine a work route, work content, a location for performing work content or a start and an end location of the unmanned vehicle. Before determining the operating mode, check the collected running data according to a preset quality standard, such as determining whether the image sharpness meets the requirements of the quality standard, only data that meets the preset quality standard can be used to determine the operating mode.

Specifically, the operating mode includes: a running route, a running tasks (such as a starting point, a stop point, a stop time), and a business behavior.

In the specific implementation process, there are several possible implementation methods: when an unmanned sales vehicle finds a place with high personnel density during the cruising process, it switches to a normal working mode and performs sales work, and marks the position coordinates in the map information in the cloud for downloading by other unmanned vehicles. When other unmanned sales vehicles of the same task are cruising slowly, the planned path automatically avoids the place where the sales task is being performed. An unmanned taxis can obtain a location with high personnel density from the map information in the cloud, and can cruise to the place with high personnel density to start passenger loading work.

On the basis of the above embodiment, the starting of the slow cruising of the unmanned vehicle includes at least but not limited to following manners: Manner 1, according to actual needs, send a slow cruising start command through a remote control device, and the unmanned vehicle starts a slow cruising function after receiving the slow cruising start command.

Manner 2, when a duration that the unmanned vehicle is in a idle state exceeds a preset duration, start the slow cruising function.

Manner 3: start the slow cruising function according to a preset time. For example, if the sales vehicle is set to work from 8:00 to 20:00, and any time period from 20:01 to 7:59 in the next day is set to the time for slow cruising, then the unmanned vehicle will be switched at 20:01 to slow cruising mode; or set any time period from 22:00 to 7:59 in the next day as the slow cruising time, then the unmanned vehicle will stop selling and be on standby at 20:00, and start the slow cruising mode at 22:00.

In a specific implementation, the cloud can send tasks through the remote control device to start the slow cruising function of the unmanned vehicle; an unmanned cleaning vehicle, after completing a road cleaning work, if the idle duration exceeds a preset duration, automatically starts the slow cruising function to collect road information; for the unmanned sales vehicle, non-working hours at night can be preset to a slow cruising time. The unmanned sales vehicle works normally in the day time, and starts the slow cruising function at night after completing the sales work to collect road information and update map information.

On the basis of the above embodiments, the method for unmanned vehicle cruising has following implementation manners in the specific implementation process:

1) when operating in the slow cruising mode, the unmanned vehicle explores maps in a safe mode and forms a map and an operating mode for subsequent normal work through the slow cruising;

2) during normal working hours of each day, the unmanned vehicle runs in the normal working mode and drives in accordance with a preset working route;

3) the unmanned vehicle can receive a mode switching instruction, where the mode switching instruction includes a target mode to switch to; the unmanned vehicle switches to the target mode for operation according to the mode switching instruction.

The method for slow cruising proposed in the solution can complete the data collection and form map data and an operating mode without affecting the normal operation of the unmanned vehicle. Map data can be shared to other unmanned vehicles in the network through the cloud. The unmanned vehicle can also obtain map data in the cloud when it is working normally, use the latest map data to plan paths in real time and perform work, thereby improving work efficiency. When the unmanned vehicle is idle, the unmanned vehicle starts the cruising mode according to the preset, explores the map and collects running data, so as to update map data in cloud in real time, and uses the collected running data to correct its own working mode, thereby improving the utilization rate of the unmanned vehicle.

The cruising mode and the working mode can be switched through instructions, preset time and idle time, and the switching manner is flexible and efficient.

Figure 3:
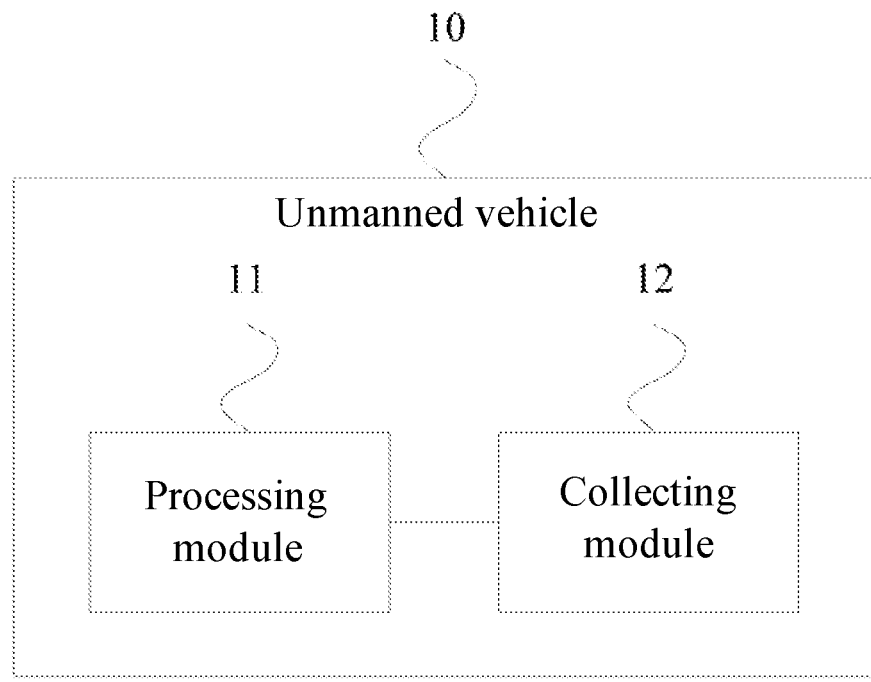
FIG. 3 is a schematic structural diagram of an unmanned vehicle provided by an embodiment of the present disclosure.

FIG. 3 is a schematic structural diagram of an unmanned vehicle provided by an embodiment of the present disclosure. As shown in FIG. 3, the unmanned vehicle 10 includes:

a processing module 11, configured to cruise according to a preset cruising mode, in a state that a slow cruising function is started;

a collecting module 12, configured to collect running data through a sensing device, where the running data is data of an environment in which a vehicle locates, collected by the vehicle during a running process;

the processing module 11 is further configured to generate a map based on the running data.

The unmanned vehicle provided in the embodiment is used to implement the technical solution in any of the foregoing method embodiments, and its implementation principles and technical effects are similar, which collects running data through a sensing device, and generates maps based on running data. Timely correction of the map is realized, so that the unmanned vehicle can always complete the work according to the latest map in the working mode.

In a specific implementation, the processing module 11 is further configured to: determine an operating mode of the unmanned vehicle according to the running data, where the operating mode includes a working mode and corresponding location information.

In a specific implementation, the processing module 11 is specifically configured to start a slow cruising function according to a slow cruising start command sent by a remote control device;

or, start the slow cruising function if a duration that the unmanned vehicle is in a idle state exceeds a preset duration;

or, start the slow cruising function according to a preset time.

Specifically, the cruising mode includes at least: an S-type cruising mode and a circle-type cruising mode.

Specifically, the sensing device includes at least one of following: an infrared sensor, a binocular camera, a monocular camera, an ultrasonic sensor, a temperature sensor, a humidity sensor, and a gas sensor.

In a specific implementation, the processing module 11 is specifically configured to determine whether the running data can be used to generate a map or determine an operating mode according to a preset quality standard.

The device provided by this embodiment can be used to implement the technical solution of the above method embodiment, and its implementation principles and technical effects are similar, and the thus details of the embodiment will not repeated here.

Figure 4:
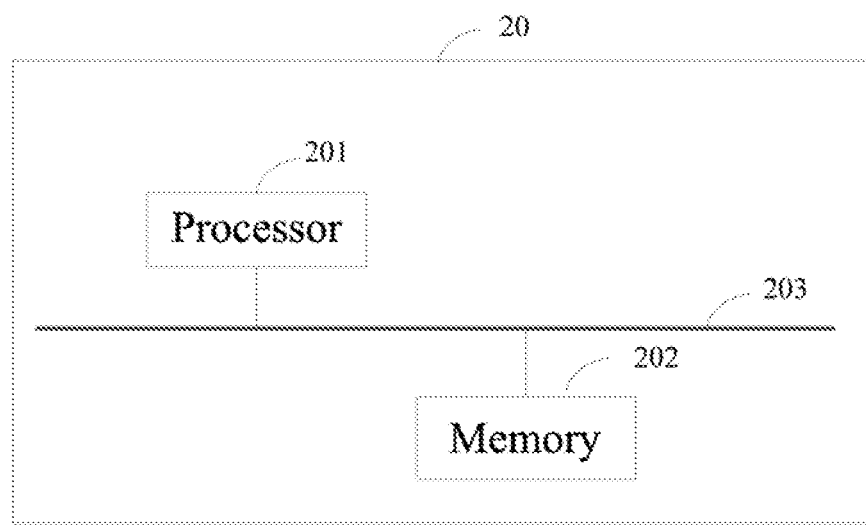
FIG. 4 is a schematic diagram of a hardware structure of an unmanned vehicle provided by an embodiment of the present disclosure.

FIG. 4 is a schematic diagram of a hardware structure of an unmanned vehicle provided by an embodiment of the present disclosure. As shown in FIG. 4, the unmanned vehicle 20 in the embodiment includes: a processor 201 and a memory 202; where, the memory 202 is configured to store computer-executable instructions;

the processor 201 is configured to execute computer execution instructions stored in the memory to implement each step performed by the terminal device in the foregoing embodiments. For details, refer to the related description in the foregoing method embodiments.

In an implementation, the memory 202 can be either independent or integrated with the processor 201.

When the memory 202 is independently set, the terminal device further includes a bus 203 used for connecting the memory 202 and the processor 201.

An embodiment of the present disclosure also provides a computer-readable storage medium, where the computer-readable storage medium is configured to store computer-executable instructions, which are used to implement the methods for unmanned vehicle cruising described above when being executed by a processor.

In several embodiments provided by the present disclosure, it should be understood that the disclosed devices and methods can be implemented in other ways. For example, the embodiments described above are only schematic. For example, the division of the modules is only a logical function division and, in actual implementations, there may be another division manners. For example, multiple modules can be combined or integrated into another system, or some features can be ignored or not implemented. In addition, the displayed or discussed mutual coupling or direct coupling or communication connection may be indirect coupling or communication connection through some interfaces, devices or modules, which may be electrical, mechanical or other forms.

The modules described as separate components may or may not be physically separated, the components displayed as modules may or may not be physical units, that is, they may be located in one place, or they may be distributed on multiple network units. Some or all of these modules can be selected according to actual needs to achieve the purpose of the solution of this embodiment.

In addition, the functional modules in the various embodiments of the present disclosure can be integrated in a processing unit, each module can be physically separate, or two or more modules can be integrated in a unit. The unit formed by the above modules can be implemented in the form of hardware, or in the form of hardware plus software functional units.

The above integrated modules implemented in the form of software functional modules can be stored in a computer-readable storage medium. The above software function module is stored in a storage medium, and includes several instructions to make a computer device (may be a personal computer, a server, or a network device, etc.) or a processor execute part of the steps of the method described in each embodiment of the present application.

It should be understood that the above processor may be a Central Processing Unit (CPU), or other general-purpose processor, a Digital Signal Processor (DSP), an Application Specific Integrated Circuit (ASIC) and so on. A general-purpose processor may be a microprocessor, or the processor may be any conventional processor, etc. The steps of the method disclosed in combination with the disclosure can be directly embodied as a hardware processor to perform, or a combination of hardware and software modules in the processor to perform.

The memory may include a high-speed RAM memory, and may also include a non-volatile storage NVM, such as at least one disk memory, and may also be a U disk, a mobile hard disk, a read-only memory, a disk or an optical disk, etc.

The bus can be an Industry Standard Architecture (ISA) bus, a Peripheral Component (PCI) bus, or an Extended Industry Standard Architecture (EISA) bus. The bus can be divided into address bus, data bus, control bus, etc. For convenience, the bus in the drawings of the present application is not limited to only one bus or one type of bus.

The above storage medium may be implemented by any type of volatile or non-volatile storage device or a combination thereof, such as static random access memory (SRAM), electrically erasable programmable read-only memory (EEPROM), erasable programmable read-only memory (EPROM), programmable read-only memory (PROM), read-only memory (ROM), magnetic memory, flash memory, magnetic disk or optical disk. The storage media may be any available media that can be accessed by a general purpose or special purpose computer.

An exemplary storage medium is coupled to the processor, such that the processor can read information from, and write information to, the storage medium. Of course, the storage medium can also be part of the processor. The processor and the storage medium may be located in an Application Specific Integrated Circuits (ASIC). Of course, the processor and storage medium can also exist as discrete components in electronic equipment or master control equipment.

Persons of ordinary skill in the art may understand that all or part of the steps of implementing the foregoing method embodiments may be completed by a program instructing related hardware. The aforementioned program may be stored in a computer-readable storage medium. When the program is executed, the steps of the foregoing method embodiments are performed; and the foregoing storage media includes: ROM, RAM, magnetic disks, or optical discs and other media that can store program codes.

Finally, it should be explained that: the above embodiments are only used to illustrate the technical solution of the present disclosure, but not limit it; Although the present disclosure has been described in detail with reference to the foregoing embodiments, those of ordinary skill in the art should understand that it can still modify the technical solutions described in the foregoing embodiments, or equivalently replace some or all of its technical features; these modifications or replacements do not depart from the scope of the technical solutions of the embodiments of the present disclosure.

What is claimed is:

1. A method for unmanned vehicle cruising, applied to a processor of an unmanned vehicle, wherein the unmanned vehicle comprises a working mode and a slow cruising mode, and the method comprises:

starting a slow cruising during non-working hours;

in a state that a slow cruising function is started, performing the slow cruising according to a preset cruising mode, and collecting running data through a sensing device, wherein the running data is data of an environment in which the unmanned vehicle locates, collected by the unmanned vehicle during a running process;

generating a map based on the running data; and determining an operating mode of the unmanned vehicle according to the running data, wherein the operating mode comprises the working mode and location information; the working mode refers to a mode for the unmanned vehicle to run during working hours; and the location information comprises a start location and an end location of the unmanned vehicle.

2. The method according to claim 1, wherein the method further comprises:

starting the slow cruising function according to a slow cruising start command sent by a remote control device;

or, starting the slow cruising function if a duration that the unmanned vehicle is in an idle state exceeds a preset duration;

or, starting the slow cruising function according to a preset time.

3. The method according to claim 1, wherein the preset cruising mode comprises at least: an S shaped cruising route and a circle-shaped cruising route.

4. The method according to claim 1, wherein the sensing device comprises at least one of: an infrared sensor, a binocular camera, a monocular camera, an ultrasonic sensor, a temperature sensor, a humidity sensor, and a gas sensor.

5. The method according to claim 1, wherein the running data comprises at least one of: images, distances of obstacles, temperature, humidity and air quality, which are collected during the running process.

6. The method according to claim 1, wherein before the generating the map based on the running data and the determining the operating mode of the unmanned vehicle according to the running data, the method further comprises:

determining whether the running data can be used to generate the map or determine the operating mode according to a preset quality standard.

7. A computer-readable storage medium, wherein the computer-readable storage medium is configured to store computer-executable instructions, which are used to implement the method for unmanned vehicle cruising according to claim 1 when being executed by a processor.

8. An unmanned vehicle, comprising: at least one processor and a memory; wherein the memory is configured to store computer-executable instructions;

the at least one processor is configured to execute the computer-executable instructions stored in the memory to:

start a slow cruising during non-working hours; wherein the unmanned vehicle comprises a working mode and a slow cruising mode;

perform the slow cruising according to a preset cruising mode, in a state that a slow cruising function is started; and collect running data through a sensing device, wherein the running data is data of an environment in which the unmanned vehicle locates, collected by the unmanned vehicle during a running process;

the at least one processor is further configured to generate a map based on the running data; and the at least one processor is further configured to determine an operating mode of the unmanned vehicle according to the running data, wherein the operating mode comprises the working mode and location information; the working mode refers to a mode for the unmanned vehicle to run during working hours; and the location information comprises a start location and an end location of the unmanned vehicle.

9. The vehicle according to claim 8, wherein the at least one processor is further configured to execute the computer-executable instructions stored in the memory to start the slow cruising function according to a slow cruising start command sent by a remote control device;

or, start the slow cruising function if a duration that the unmanned vehicle is in an idle state exceeds a preset duration;

or, start the slow cruising function according to a preset time.

10. The vehicle according to claim 8, wherein the cruising mode comprises at least: an S shaped cruising route and a circle-shaped cruising route.

11. The vehicle according to claim 8, wherein the sensing device comprises at least one of: an infrared sensor, a binocular camera, a monocular camera, an ultrasonic sensor, a temperature sensor, a humidity sensor, and a gas sensor.

12. The vehicle according to claim 8, wherein the at least one processor is further configured to execute the computer-executable instructions stored in the memory to determine whether the running data can be used to generate the map or determine the operating mode according to a preset quality standard.

* * * * *